July 21, 1953
J. M. WEISS
2,646,171
PROCESSES FOR SEPARATION AND RECOVERY
OF COMPONENTS OF A SOLUTION
Filed June 14, 1949
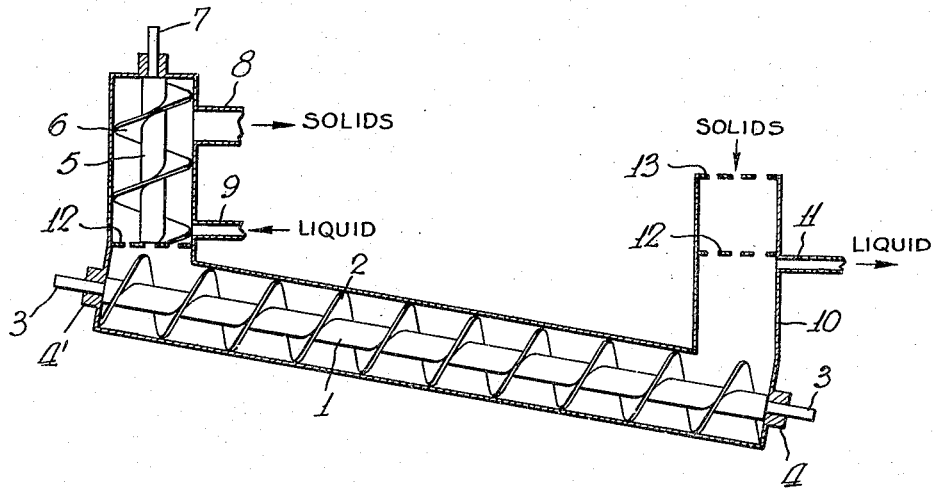
INVENTOR
John M. Weiss
BY
Dean Fairbank & Hirsch
ATTORNEY Patented July 21, 1953

2,646,171

UNITED STATES PATENT OFFICE 2,646,171

PROCESS FOR SEPARATION AND RECOVERY OF COMPONENTS OF A SOLUTION

John M. Weiss, New York, N. Y., assignor to John M. Weiss and Co., New York, N. Y.

Application June 14, 1949, Serial No. 99,006

12 Claims. (Cl. 210—42.5)

This invention is concerned with a method for the separation of mixtures of chemical individuals so as to obtain and recover relatively pure compounds. It will be specifically illustrated in connection with the separation of amino acids from protein hydrolyzates, but it must be understood that the use of the principles disclosed is not limited to amino acids, but may be employed with other mixtures of acids or of bases, and with a great variety of chemical mixtures.

The use of ion exchange zeolites and resins to separate materials of widely different chemical nature is well known. Certain resins adsorb cations exclusively and others adsorb anions exclusively. This invention does not concern itself with such separations where the zeolite, resin or other adsorbent employed adsorbs one constituent but does not adsorb another. It is concerned with separations by zeolites, resins, activated carbons and other adsorbing substances where two or more substances are adsorbed from a solution by the same medium, and where one is preferentially, but not exclusively, adsorbed from the solution containing the several substances by the adsorbing medium being employed.

To illustrate the principle which is believed to be new, and taking the simplest case, a solution of two materials designated as A and B is assumed. Material A is adsorbed preferentially, but not exclusively, by the medium used and will displace B which has already been adsorbed, the extent of the replacement varying with the concentration of A and B in the solution and in the body of adsorbent. If we take a fixed bed of adsorbent and pass a given solution of A and B downward through it, both A and B will be adsorbed together until the adsorbent is saturated. In the meantime, however, the top of the bed has become progressively richer in A due to interchange with the entering solution and as the adsorbent approaches saturation, the effluent begins to contain a small amount of B with a negligible amount of A. We have then at the top of the bed a band comprising substantially pure A and then progressively downward a mixture of A and B with the proportion of B increasing as we progress downward.

If the passage of solution is continued, A continues to be adsorbed by replacement of B, and gradually the entire bed will contain high purity A. While this is going on, the effluent will carry away some A, the proportion increasing with time, and hence the effluent needs further treatment to get maximum yields of A. Further separation can be accomplished by having enough stationary beds in series so that when the first is pure A, the last in the series is still unsaturated, but this makes a very complicated set-up, since each bed of the series must be at least in duplicate to allow for alternate adsorption, elution and regeneration. A very complicated set of pipes and valves is obviously necessary.

My invention simplifies matters so that a single assembly of adsorption equipment can accomplish the substantially complete separation of one constituent continuously, by moving the adsorbent countercurrent to the flow of liquid, removing saturated material A at the point of entering liquid and replacing it with fresh adsorbent at the liquid exit end, and maintaining a varying equilibrium between adsorbed A and B in the direction of liquid flow from substantially pure A at the entering end to B free from A at the exit, but with the equilibrium at any plane perpendicular to the liquid flow substantially constant during the operation.

Applying the foregoing to more complicated mixtures, we merely need to consider B as representing several substances, for example P, Q, R, etc. If these are to be separated, the process is repeated on the effluent from the cycle used to separate A so that P is obtained, repeated again on the effluent from P to separate Q, and so on, in the order of preferential absorption.

So as to illustrate the process more specifically, reference may be had to the drawing, which illustrates an equipment assembly by which the process may be carried out, but it must be understood that this drawing and the accompanying description are not intended to place limitations on the scope of the invention, either as to solid adsorbents employed or as to the chemical nature of the substances separated.

The drawing shows in vertical cross-section one of many types of apparatus by which the process of this invention can be carried out. In the form illustrated there is employed an inclined tube 1 in which is mounted a closely fitting screw conveyor 2 with shaft 3 passing through liquid-tight stuffing boxes 4 and 4'. The conveyor 2 upon being rotated exerts a thrust up the tube from 4 to 4', and may be driven from any suitable source of power such as a motor and reducing gearing (not shown). In a leg 5 at the upper end of the inclined tube 1, a second screw conveyor 6 may be positioned with a shaft 7 rotated by any suitable means (not shown) to exert a vertical thrust upward. This leg has an outlet 8 which serves for the discharge of solid and an inlet 9 for the liquid to be treated.

At the lower end of the inclined tube is a second vertical leg 10 with a liquid overflow 11, positioned at such a height as to keep the liquid level 12 approximately at a height so as to be just below the liquid inlet 9 and covering the conveyor 2 at that point. An opening 13 in the leg 10 and above the outlet 11 serves for the introduction of solid.

In carrying out the process by the use of this equipment, one may treat, for instance, a purified solution containing the hydrochlorides of several amino acids, such as aspartic acid, glutamic acid, alanine and leucine, and an ion exchange resin which may be of the modified sulphonated phenolic-formaldehyde type such as that sold by The Permutit Co. Ltd. under the trade-mark "Zeo Karb 215." Such a resin in general adsorbs basic material and acts through the amino group of the amino acids being separated.

At the start of the operation the resin is introduced at 13 and the conveyor operated so as to fill the tube 1 with this resin. The conveyor is then stopped and the solution slowly introduced at 9 and allowed to flow along the spiral path formed by the conveyor, and out at 11, until the out-flowing liquid shows a trace of aspartic acid. The conveyor is again started and resin is introduced continuously at 13 so as to pass into the tube 1 and be picked up by the conveyor 6, moved along the tube, and discharged at the opening 8. From here on the flows of resin and solution are continuous.

The speeds of resin addition and flow of the solution are regulated so that the liquid effluent at 11 is substantially free of aspartic acid and the material adsorbed by the resin issuing at 8 is aspartic acid substantially free of the other amino acids except for that contained in the liquid mechanically held on the surface of the resin. If the aspartic acid adsorbed in the resin exiting at outlet 8 is found to contain excessive amounts of the other amino acids present, the flow of solution relative to resin flow is increased, or the relative flow of the liquid and the absolute flow of the solid may be simultaneously adjusted until a satisfactory condition is attained. Likewise, one may increase the relative flow of solid or decrease the flow of liquid if aspartic acid appears in the liquid effluent from outlet 11.

The resin removed at 8 is washed with water to remove adherent solution, and the washings may be concentrated before being returned to the solution feed. The washed resin is then eluted with dilute acid to remove the aspartic acid by displacement and the eluted solution substantially free from amino acids other than aspartic acid worked up in any convenient way. The resin is then treated to remove the acid, brought back to its original condition, and returned as feed at 13. These operations of washing, elution and regeneration may be in batches or may be done continuously by suitable mechanical arrangements.

The process may then be repeated in a second similar unit assembly of equipment to separate glutamic acid and in a third unit to separate alanine with a substantially pure solution of leucine overflowing from the final step. These successive assemblies of equipment will preferably be of somewhat different size or conditions of operation so as to be able to maintain a constant flow of liquid through all the units and thereby maintain continuous operation of the series of units as a whole. The variations must obviously be proportioned to the relative amounts of the several amino acids in the feed. It is desirable where possible to maintain the unit size constant and vary the speed of circulation of the resin, the type of resin, or both.

In this method of operation it is necessary to use a solid adsorbent which has sufficient mechanical strength so it does not pulverize under the conditions and hence form an impermeable or difficultly permeable mass in the screw conveyor or other mechanical means employed to transport the solid.

For a continuous process it is important that some means be employed for countercurrent movement of the solids and liquids. Although in the apparatus illustrated the solids are advanced countercurrent to the flow of the liquid to be treated, it will be obvious that various other types of construction and arrangements of apparatus parts may be employed. The conveyor 2 may be arranged vertically or horizontally, instead of inclined as shown. The helical screw may have its blade or blades perforated to permit a portion of the liquid to flow therethrough.

The solids may be fed along by other means than the conveyor 6, particularly if they be of a friable character. The solids may be advanced in baskets or other receptacles connected together in series and having perforated or reticulated walls.

In some cases the liquid may flow through a series of chambers, and batches of the solids may be advanced step by step countercurrent to the liquid flow or from one chamber to the next. Thus the advancement of the liquid and solids in opposite directions may be continuous or intermittent, but in any event the overall time during which the liquid and solids are in contact should be such that the liquid at the point of outflow is substantially exhausted of one ingredient, and the solid material at the point where it leaves contact with the liquid has reached or approaches saturation with that ingredient.

The solid adsorbent specifically described was one of the type which absorbs cations and acted on the amino acids through the amino groups present. Were it desired to act through the acid groups or anions, an amine resin, either an aromatic amine-formaldehyde or an aliphatic amine-formaldehyde composition, would be used, for instance, such as that sold by Permutit Company under the trade-name of "Deacidite." When such are used the elution liquid employed would be alkaline in nature. This type of resin would be employed for the separation of organic acids which do not contain the amino group.

As previously noted, zeolites or other adsorbents with suitable properties may be employed in the process, and it is understood that the separations accomplished may be between two or more organic solutes, between two or more inorganic solutes such as sodium and ammonium ions, or between some organic and some inorganic solutes. In general the process may be used to separated acids, generally organic acids, although mineral acids are not excluded, or bases which may be either organic or inorganic in nature, in each case, when one of the materials separated is differentially but not exclusively adsorbed by the solid adsorbent employed. The invention is not confined to aqueous solutions but may be used with alcoholic solutions, ether solutions, hydrocarbon solutions, and solutions in all types of inorganic and organic solvents.

Having thus described my invention what I claim as new and desire to secure by Letters Patent is:

1. A cyclic process of separating a component of a mixture of at least two adsorbable compounds contained in a solution, comprising mechanically advancing a mass of solid adsorbent which will adsorb said compounds preferentially, passing said solution continuously countercurrent to and in contact with said mass, removing adsorbent saturated substantially only with the desired compound from contact with the entering solution, continuously introducing an amount of fresh adsorbent substantially equal to that removed from the cycle into contact with the solution leaving the cycle, and regulating the absolute and relative rates of flow of the solution and adsorbent so that the solution leaving the cycle is substantially exhausted of the desired compound.

2. A cyclic process of separating a component of a mixture of at least two adsorbable compounds contained in a solution, comprising mechanically advancing a mass of solid adsorbent which will adsorb said compounds preferentially, passing said solution continuously countercurrent to and in contact with said mass, removing adsorbent saturated substantially only with the desired compound from contact with the entering solution, continuously introducing an amount of fresh adsorbent substantially equal to that removed from the cycle into contact with the solution leaving the cycle, regulating the absolute and relative rates of flow of the solution and adsorbent so that solution leaving the cycle is substantially exhausted of the desired compound, eluting the desired component from the removed adsorbent and returning said adsorbent for re-use.

3. A cyclic process of separating amino acids from a solution containing a plurality of such acids, comprising passing said solution countercurrent to a moving mass of a solid adsorbent which has the property of preferentially adsorbing said acids, removing adsorbent saturated substantially with only one amino acid from contact with the entering solution, continuously introducing an amount of fresh adsorbent substantially equal to that withdrawn from the cycle into contact with the solution leaving the cycle, and regulating the relative and absolute rates of movement of solution and adsorbent so that the solution leaving the cycle is substantially exhausted of the amino acid adsorbed in the adsorbent removed from the cycle.

4. A cyclic process of separating amino acids from a solution containing a plurality of such acids, comprising passing said solution countercurrent to a moving mass of a solid adsorbent which has the property of preferentially adsorbing said acids, removing adsorbent saturated substantially with only one amino acid from contact with the entering solution, continuously introducing an amount of fresh adsorbent substantially equal to that withdrawn from the cycle into contact with the solution leaving the cycle, regulating the relative and absolute rates of movement of solution and adsorbent so that the solution leaving the cycle is substantially exhausted of the amino acid adsorbed in the adsorbent removed from the cycle, eluting the adsorbed amino acid from the removed adsorbent and returning said adsorbent for re-use.

5. A cyclic process of separating organic acids from a solution containing a plurality of such acids, comprising passing said solution countercurrent to a moving mass of a solid adsorbent which has the property of preferentially adsorbing said acids, removing adsorbent saturated substantially with only one organic acid from contact with the entering solution, continuously introducing an amount of fresh adsorbent substantially equal to that withdrawn from the cycle into contact with the solution leaving the cycle, and regulating the relative and absolute rates of movement of solution and adsorbent so that the solution leaving the cycle is substantially exhausted of the organic acid adsorbed in the adsorbent removed from the cycle.

6. A cyclic process of separating organic acids from a solution containing a plurality of such acids, comprising passing said solution countercurrent to a moving mass of a solid adsorbent which has the property of preferentially adsorbing said acids, removing adsorbent saturated substantially with only one organic acid from contact with the entering solution, continuously introducing an amount of fresh adsorbent substantially equal to that withdrawn from the cycle into contact with the solution leaving the cycle, regulating the relative and absolute rates of movement of solution and adsorbent so that the solution leaving the cycle is substantially exhausted of the organic acid adsorbed in the adsorbent removed from the cycle, eluting the adsorbed organic acid from the removed adsorbent and returning said adsorbent for re-use.

7. A cyclic process of separating bases from a solution containing a plurality of such bases, comprising passing said solution countercurrent to a moving mass of a solid adsorbent which has the property of preferentially adsorbing said bases, removing adsorbent saturated substantially with only one base from contact with the entering solution, continuously introducing an amount of fresh adsorbent substantially equal to that withdrawn from the cycle into contact with the solution leaving the cycle, and regulating the relative and absolute rates of movement of solution and adsorbent so that the solution leaving the cycle is substantially exhausted of the base adsorbed in the adsorbent removed from the cycle.

8. A cyclic process of separating bases from a solution containing a plurality of such bases, comprising passing said solution countercurrent to a moving mass of a solid adsorbent which has the property of preferentially adsorbing said bases, removing adsorbent saturated substantially with only one base from contact with the entering solution, continuously introducing an amount of fresh adsorbent substantially equal to that withdrawn from the cycle into contact with the solution leaving the cycle, regulating the relative and absolute rates of movement of solution and adsorbent so that the solution leaving the cycle is substantially exhausted of the base adsorbed in the adsorbent removed from the cycle, eluting the adsorbed base from the removed adsorbent and returning said adsorbent for re-use.

9. The process of claim 1 where the process is repeated a plurality of times to successively remove individually a plurality of constituents.

10. The process of claim 3 where the process is repeated a plurality of times to successively remove individually a plurality of amino acids.

11. The process of claim 5 where the process is repeated a plurality of times to successively remove individually a plurality of organic acids.

12. The process of claim 7 where the process is repeated a plurality of times to successively remove individually a plurality of bases.

JOHN M. WEISS.

References Cited in the file of this patent

UNITED STATES PATENTS

| Number | Name | Date |
|---|---|---|
| 1,707,302 | Godsey | Apr. 2, 1929 |
| 1,745,421 | Higgins | Feb. 4, 1930 |
| 2,487,574 | Meng | Nov. 8, 1949 |

OTHER REFERENCES

Ind. & Eng. Chemistry, October 1941, pages 1270–71.

Chromatographic Adsorption Analysis, by Harold H. Stain, vol. II, 1945, pages 12, 13, 45, 46, 72, 85–89, 155–157.